US011456825B2

(12) United States Patent
Khoshnevisan et al.

(10) Patent No.: US 11,456,825 B2
(45) Date of Patent: Sep. 27, 2022

(54) NON-NUMERIC FEEDBACK TIMING INDICATORS FOR HARQ-ACK

(71) Applicant: QUALCOMM Incorporated, San Diego, CA (US)

(72) Inventors: Mostafa Khoshnevisan, San Diego, CA (US); Jing Sun, San Diego, CA (US); Kapil Bhattad, Bangalore (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/987,783

(22) Filed: Aug. 7, 2020

(65) Prior Publication Data

US 2021/0050957 A1    Feb. 18, 2021

(30) Foreign Application Priority Data

Aug. 16, 2019  (IN) .............................. 201941033075

(51) Int. Cl.
*H04L 1/18* (2006.01)
*H04L 5/00* (2006.01)
*H04W 72/04* (2009.01)
*H04W 72/12* (2009.01)

(52) U.S. Cl.
CPC .......... *H04L 1/1854* (2013.01); *H04L 1/1812* (2013.01); *H04L 1/1861* (2013.01); *H04L 5/0055* (2013.01); *H04W 72/042* (2013.01); *H04W 72/1289* (2013.01)

(58) Field of Classification Search
CPC . H04W 72/0446; H04W 84/12; H04W 84/18; H04W 28/04; H04W 28/06; H04W 72/042; H04W 72/1289; H04L 1/1812; H04L 1/1861; H04L 5/0055
USPC ........................................................ 370/336
See application file for complete search history.

(56) References Cited

U.S. PATENT DOCUMENTS

2014/0126551 A1* 5/2014 Nammi ................. H04L 1/0025
                                                370/336
2015/0003425 A1* 1/2015 Kim ...................... H04L 5/0055
                                                370/336

OTHER PUBLICATIONS

3GPP TSG RAN WG1 #97, Reno, USA, May 13-17, 2019, R1-1905953, Title: Discussion on scheduling and HARQ for NR-U, Source: ZTE, Sanechips, Agenda item: 7.2.2.2.3. (Year: 2019).*
3GPP TSG RAN WG1 Meeting #93, Busan, Korea, May 21-25, 2018, R1-1806522, Source: Intel Corporation, Title: Remaining details on scheduling and HARQ, Agenda item: 7.1.3.3.2. (Year: 2018).*
3GPP TSG RAN WG1 Meeting #95, Spokane, USA, Nov. 12-16, 2018, R1-1814146, Agenda item: 7.2.2.4.3, Source: Huawei, HiSilicon, Title: Feature lead summary of HARQ enhancements in NR-U. (Year: 2018).*
3GPP TSG RAN WG1 Ad-Hoc Meeting 1901, Taipei, Taiwan, Jan. 21-25, 2019, R1-1900245, Agenda item: 7.2.2.2.3, Source: Fujitsu, Title: Scheduling/HARQ enhancements for NR-U. (Year: 2019).*

(Continued)

*Primary Examiner* — Peter G Solinsky
*Assistant Examiner* — Sanjay K Dewan
(74) *Attorney, Agent, or Firm* — Patterson & Sheridan, LLP

(57) ABSTRACT

Certain aspects of the present disclosure provide techniques for processing physical downlink shared channel (PDSCH) transmissions scheduled with non-numeric timing feedback indicators.

28 Claims, 15 Drawing Sheets

(56) References Cited

OTHER PUBLICATIONS

3GPP TSG RAN WG1 NR AdHoc #3, Nagoya, Japan, Sep. 18-21, 2017, R1-1716440, Agenda item: 6.3.4, Source: Qualcomm Incorporated, Title: CA and BWP. (Year: 2017).*
3GPP TSG-RAN WG2 Meeting # 101, Athens, Greece, Feb. 26-Mar. 2, 2018, R2-1803118, Agenda item: 10.3.1.3, Source: Qualcomm Incorporated, Title: Discussion on new MAC CE for MIMO WID/SID: NR_newRAT-Core-Release 15. (Year: 2018).*
Intel Corporation: "Remaining Details on Scheduling and HARQ", 3GPP Draft, 3GPP TSG RAN WG1 Meeting #93, R1-1806522 Intel Schedharq, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018 May 20, 2018 (May 20, 2018), XP051441723, 7 Pages, Retrieved from the Internet: URL:http://www.3gpp.org/ftp/Meetings%5F3GPP%5FSYNC/RAN1/Docs/ [retrieved on May 20, 2018] section 3.
International Search Report and Written Opinion—PCT/US2020/045540—ISA/EPO—dated May 26, 2021.
Qualcomm Incorporated: "CA and BWP", 3GPP Draft, 3GPP TSG RAN WG1 NR AdHoc#3, R1-1716440, CA_BWP, 3rd Generation Partnership Project (3GPP), Mobile Competence Centre, 650, Route Des Lucioles, F-06921, Sophia-Antipolis, Cedex, France, vol. RAN WG1, No. Nagoya, Japan, Sep. 18, 2017-Sep. 21, 2017, Sep. 17, 2017, XP051339895, 7 Pages, Retrieved from the Internet: URL: http://www.3gpp.org/ftp/Meetings_3GPP_SYNC/RAN1/Docs/ [retrieved on Sep. 17, 2017], Sections 1-6, 3, 4.1 and 4.2, figure 2, section 3.
Qualcomm Incorporated: "Discussion on New MAC CE for MIMO," 3GPP Draft, 3GPP TSG-RAN WG2 Meeting #101, R2-1803118, 3rd Generation Partnership Project (3GPP), Mobile Competence Centre, 650, Route Des-Lucioles, F-06921 Sophia-Antipolis Cedex, France, vol. RAN WG2, No. Athens, Greece, Feb. 26, 2018-Mar. 2, 2018, Feb. 16, 2018, XP051400402, pp. 1-4, Retrieved from the Internet: URL: http://www.3gpp.org/ftp/tsg%5Fran/WG2%5FRL2/TSGR2%5F101/Docs/ [retrieved on Feb. 16, 2018] p. 3, sections 2.1,2.2 and 2.3.
Fujitsu: "Scheduling/HARQ Enhancements for NR-U", 3GPP Draft, 3GPP TSG RAN WG1 Meeting Ad-Hoc Meeting 1901, R1-1900245 HARQ Enhancement for NR-U Final, 3rd Generation Partnership Project 3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593160, 5 Pages, Retrieved from the Internet: URL:http://www.3gpp.org/ftp/Meetings%5F3GPP%5FSYNC/RAN1/Docs/R1%2D1900245%2Ezip.
Huawei, et al., "Feature Lead Summary of HARQ Enhancement in NR-U", 3GPP Draft, 3GPP TSG RAN WG1 Meeting #95, R1-1814146, Feature Lead Summary of HARQ Enhancement in NR-U (RAN1_95) V3, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 19, 2018 (Nov. 19, 2018), XP051494603, 15 Pages, Retrieved from the Internet: URL: http://www.3gpp.org/ftp/tsg%5Fran/WG1%5FRL1/TSGR1%5F95/Docs.
Partial International Search Report—PCT/US2020/045540—ISA/EPO—dated Nov. 13, 2020.
ZTE, et al., "Discussion on Scheduling and HARQ for NR-U", R1-1905953 Scheduling and HARQ, 3GPP TSG RAN WG1 #97, 3GPP Draft, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 4, 2019 (May 4, 2019), 8 Pages, XP051707995, Retrieved from the Internet: URL: http://www.3gpp.org/ftp/tsg%5Fran/WG1%5FRL1/TSGR1%5F97/Docs/R1%2D1905953%2Ezip, http://www.3gpp.org/ftp/Meetings%5F3GPP%5FSYNC.

\* cited by examiner

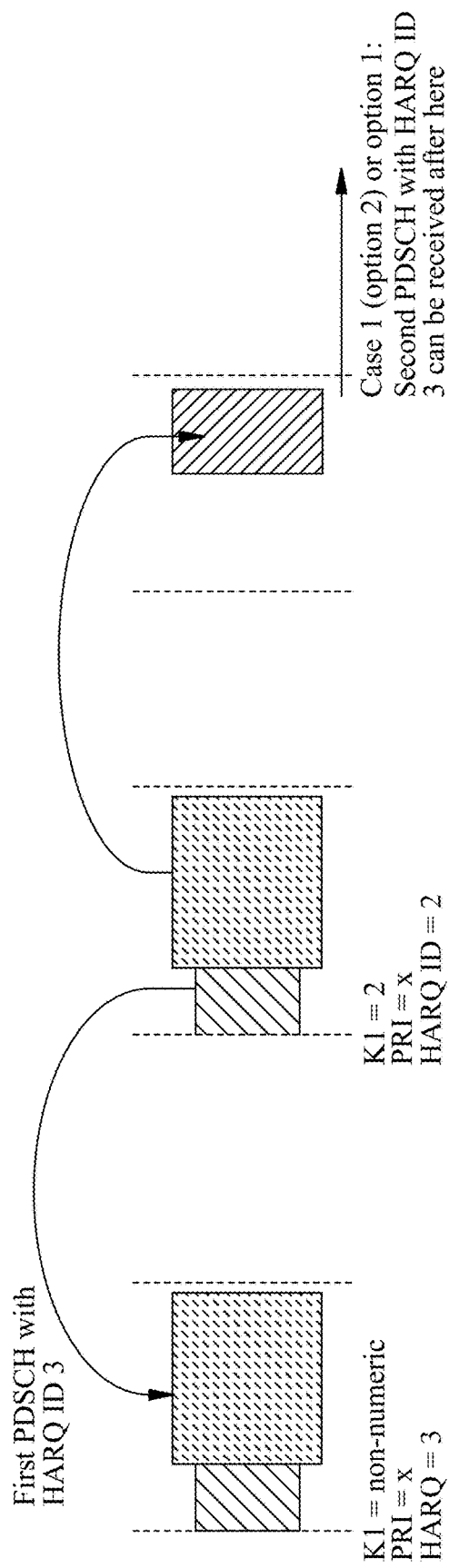
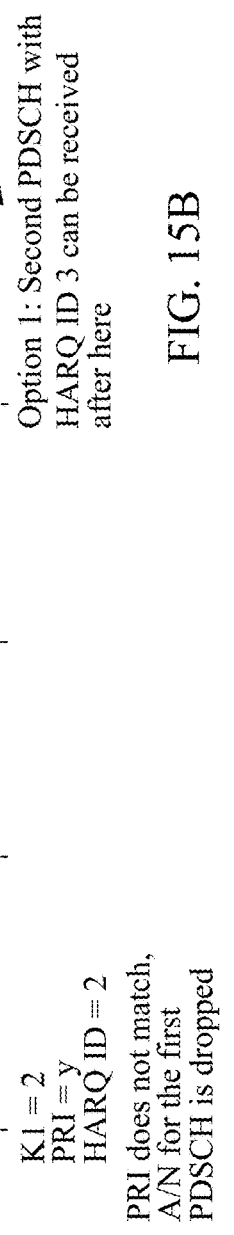
FIG. 15A
FIG. 15B

NON-NUMERIC FEEDBACK TIMING INDICATORS FOR HARQ-ACK

CROSS-REFERENCE TO RELATED APPLICATION(S)

This application claims benefit of and priority to Indian Provisional Application No. 201941033075, filed Aug. 16, 2019, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for non-numeric feedback timing indicators for HARQ-ACK.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a first downlink control information (DCI) that schedules a first physical downlink shared channel (PDSCH) transmission and includes a non-numeric feedback timing indicator, receiving a second DCI that schedules a second PDSCH and includes a numeric feedback timing indicator, wherein the second DCI comprises a first detected DCI with a numeric feedback timing indicator that is detected after the first DCI that schedules the first PDSCH transmission, and determining at least one of if or when to provide acknowledgment feedback for the first PDSCH transmission based at least in part on the numeric feedback timing indicator included in the second DCI.

Certain aspects provide a method for wireless communication by a network entity. The method generally includes sending a first downlink control information (DCI) that schedules a first physical downlink shared channel (PDSCH) transmission and includes a non-numeric feedback timing indicator, sending a second DCI that schedules a second PDSCH and includes a numeric feedback timing indicator, wherein the second DCI comprises a first detected DCI with a numeric feedback timing indicator that is detected after the first DCI that schedules the first PDSCH transmission, and determining at least one of if or when the UE Is to provide acknowledgment feedback for the first PDSCH transmission based at least in part on the numeric feedback timing indicator included in the second DCI.

Certain aspects provide a method for wireless communication by a user equipment (UE). The method generally includes receiving a first downlink control information (DCI) that schedules a physical downlink shared channel (PDSCH) transmission for a first hybrid automatic repeat request (HARQ) process ID and includes a non-numeric feedback timing indicator, receiving a second DCI that schedules a PDSCH transmission for a second HARQ process ID, and determining when the UE can receive another DCI scheduling another PDSCH transmission for the first HARQ process ID based, at least in part, on information in the second DCI.

Certain aspects provide a method for wireless communication by a network entity. The method generally includes sending a first downlink control information (DCI) that schedules a physical downlink shared channel (PDSCH) transmission for a first hybrid automatic repeat request (HARQ) process ID and includes a non-numeric feedback timing indicator, sending a second DCI that schedules a PDSCH transmission for a second HARQ process ID, and determining when the UE can receive another DCI scheduling another PDSCH transmission for the first HARQ process ID based, at least in part, on information in the second DCI.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 15A and 15B illustrates the HARQ-ACK transmissions for DCI and PDSCH transmissions when the HARQ process ID is different, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
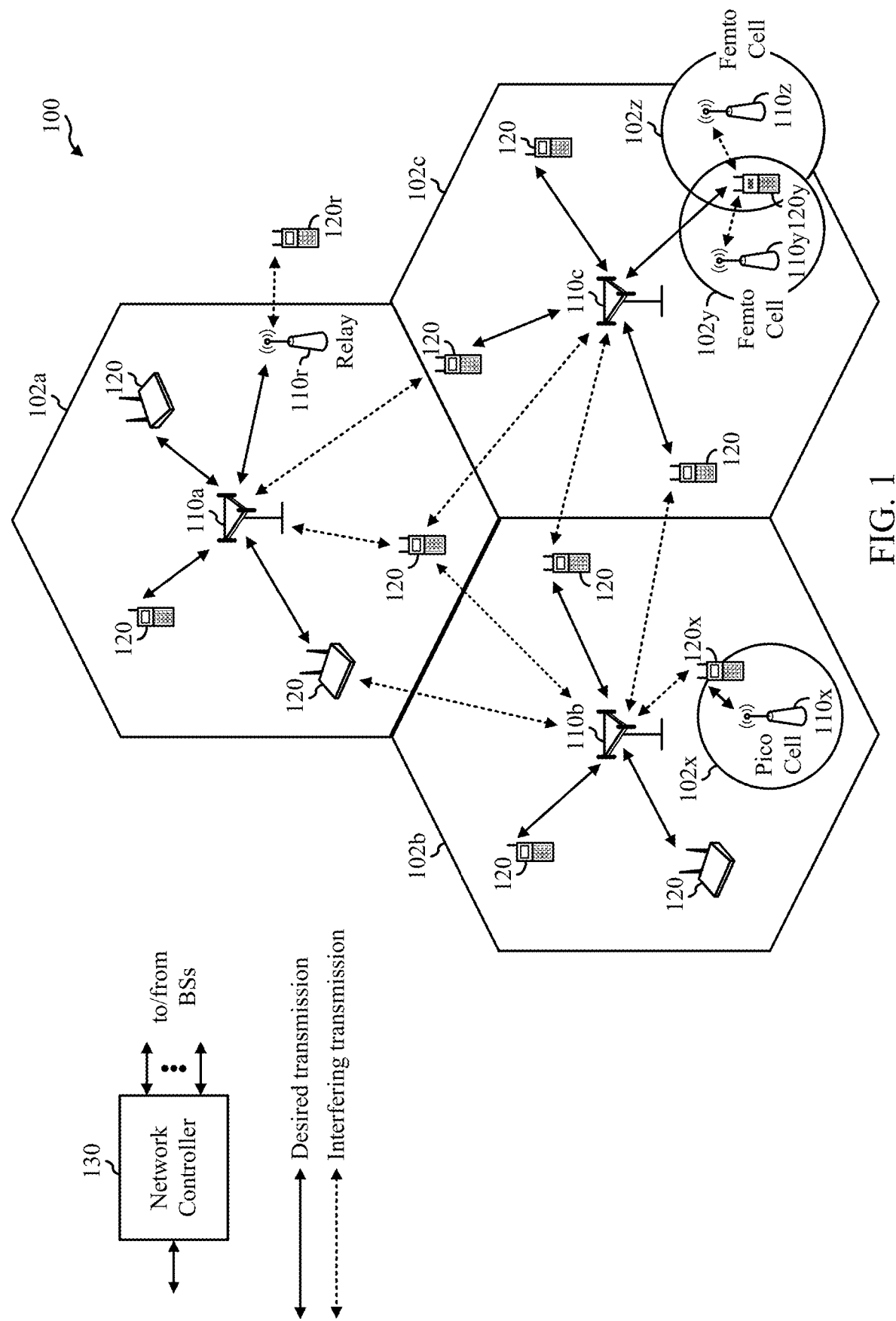
FIG. 1 is a block diagram conceptually illustrating an example telecommunications system, in accordance with certain aspects of the present disclosure.

Aspects of the present disclosure provide apparatus, methods, processing systems, and computer readable mediums for processing downlink transmissions scheduled with non-numeric acknowledgment feedback timing indicators.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 is configured to perform operations described below with reference to FIGS. 9 and 13 to process downlink transmissions scheduled with non-numeric feedback timing indicators. Further, a BS 110 may be configured to perform operations described below with reference to FIGS. 10 and 14 to process HARQ ACK for downlink transmissions scheduled with non-numeric feedback timing indicators As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplexing (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
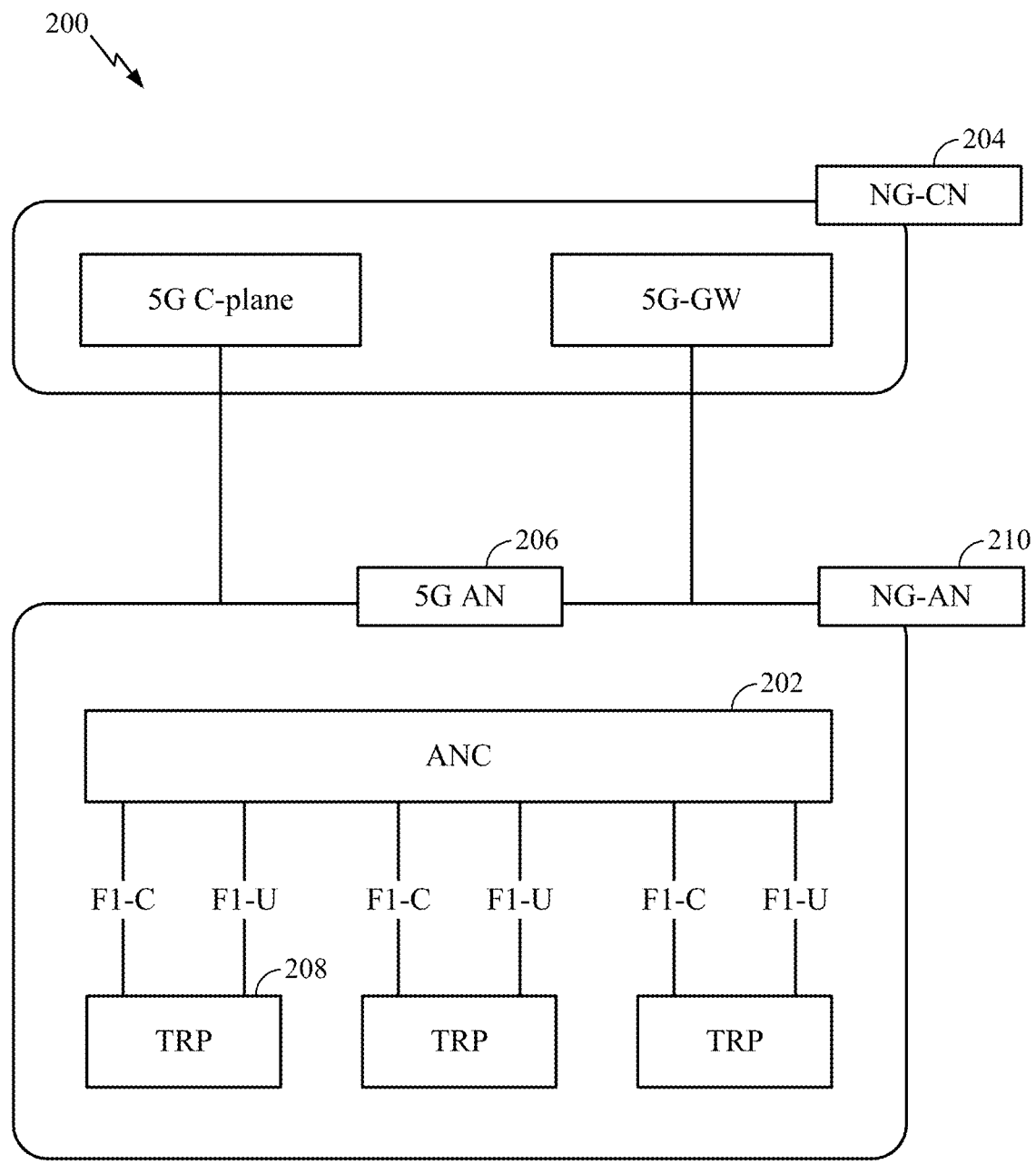
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
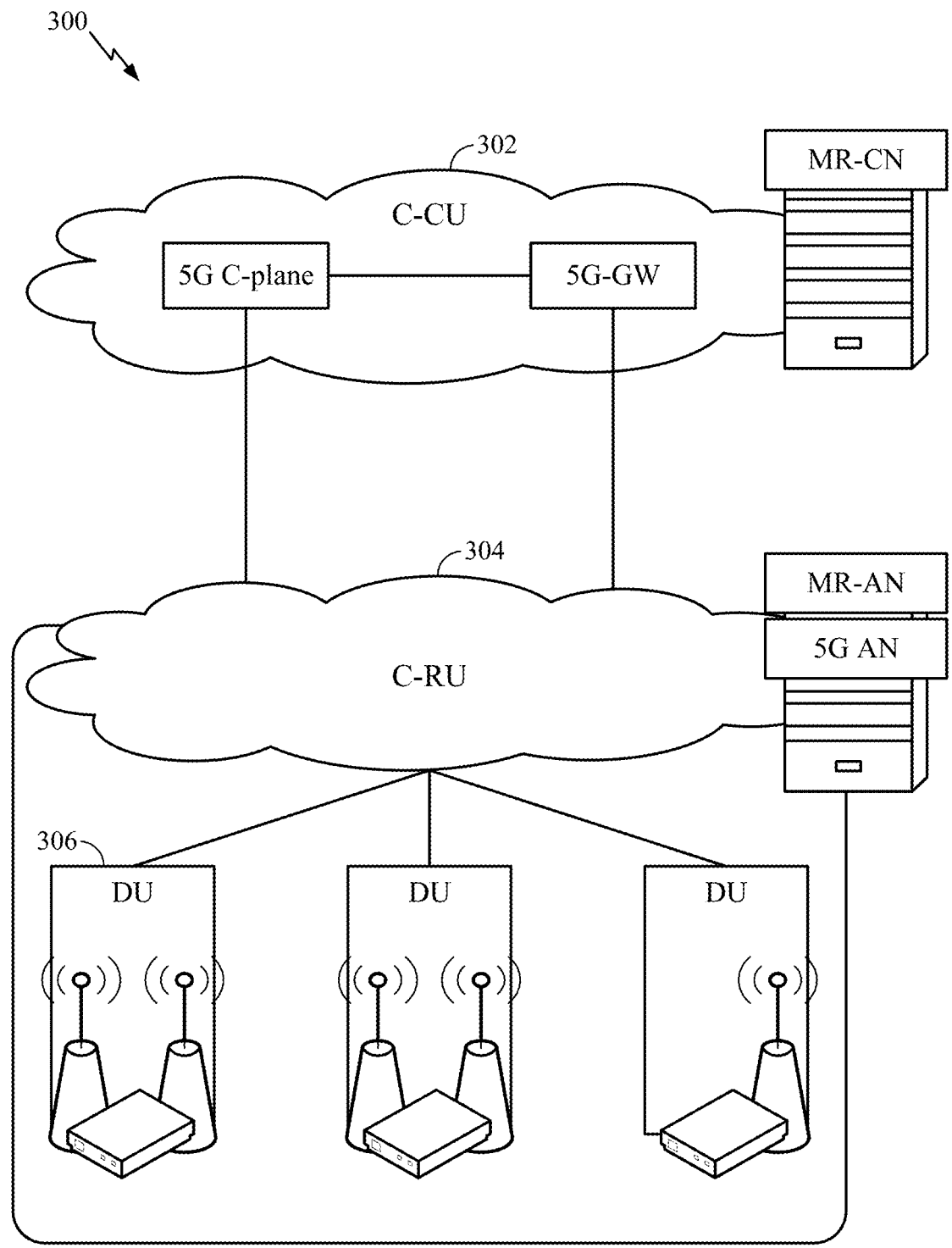
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
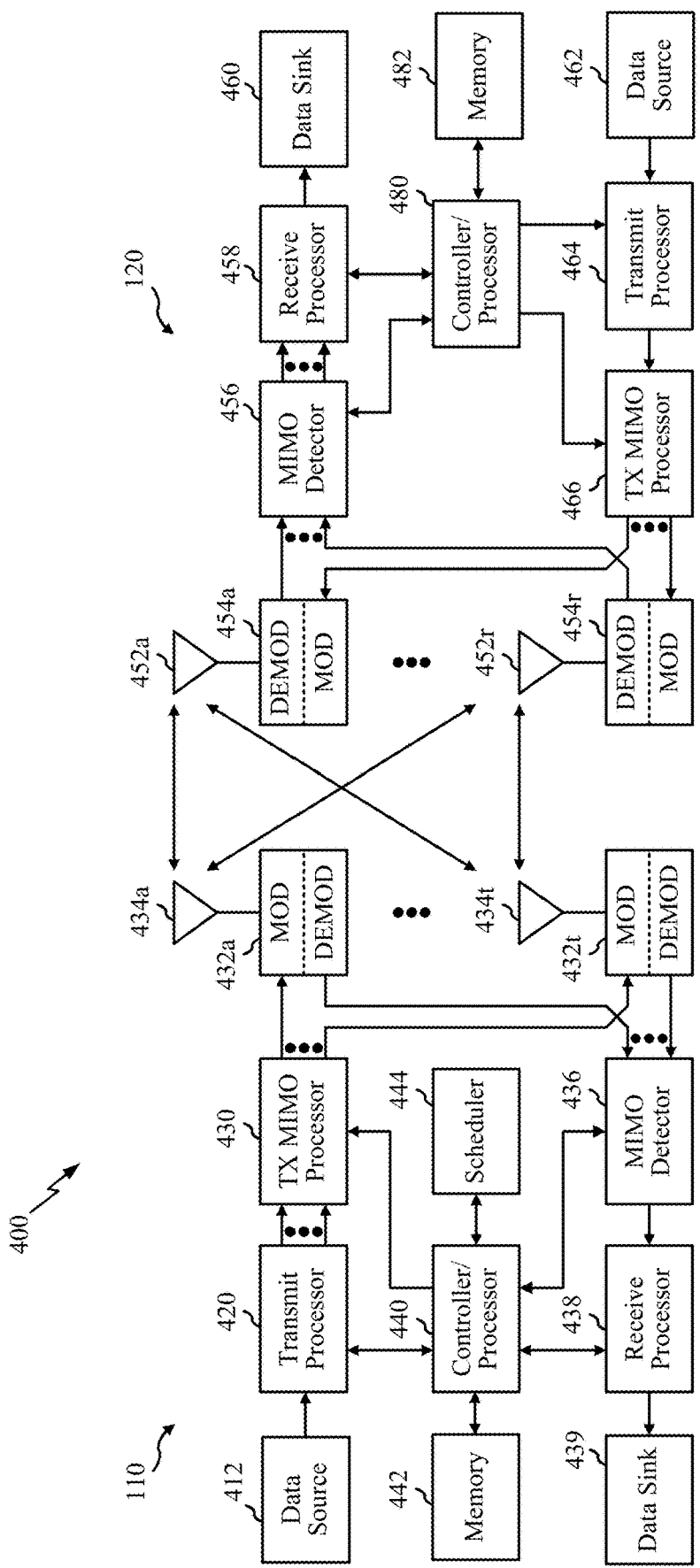
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for rate matching for multi-TRP transmission.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
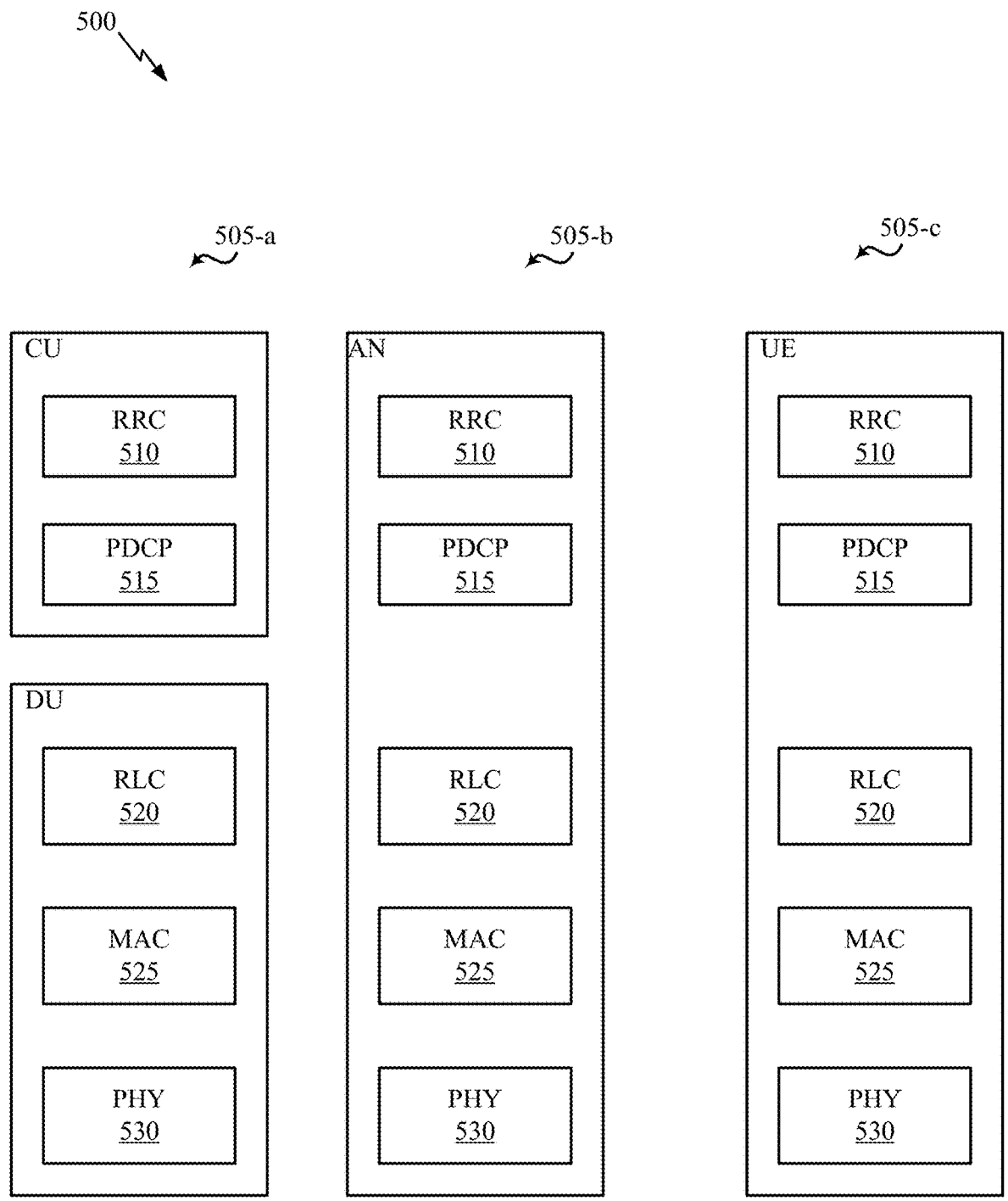
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
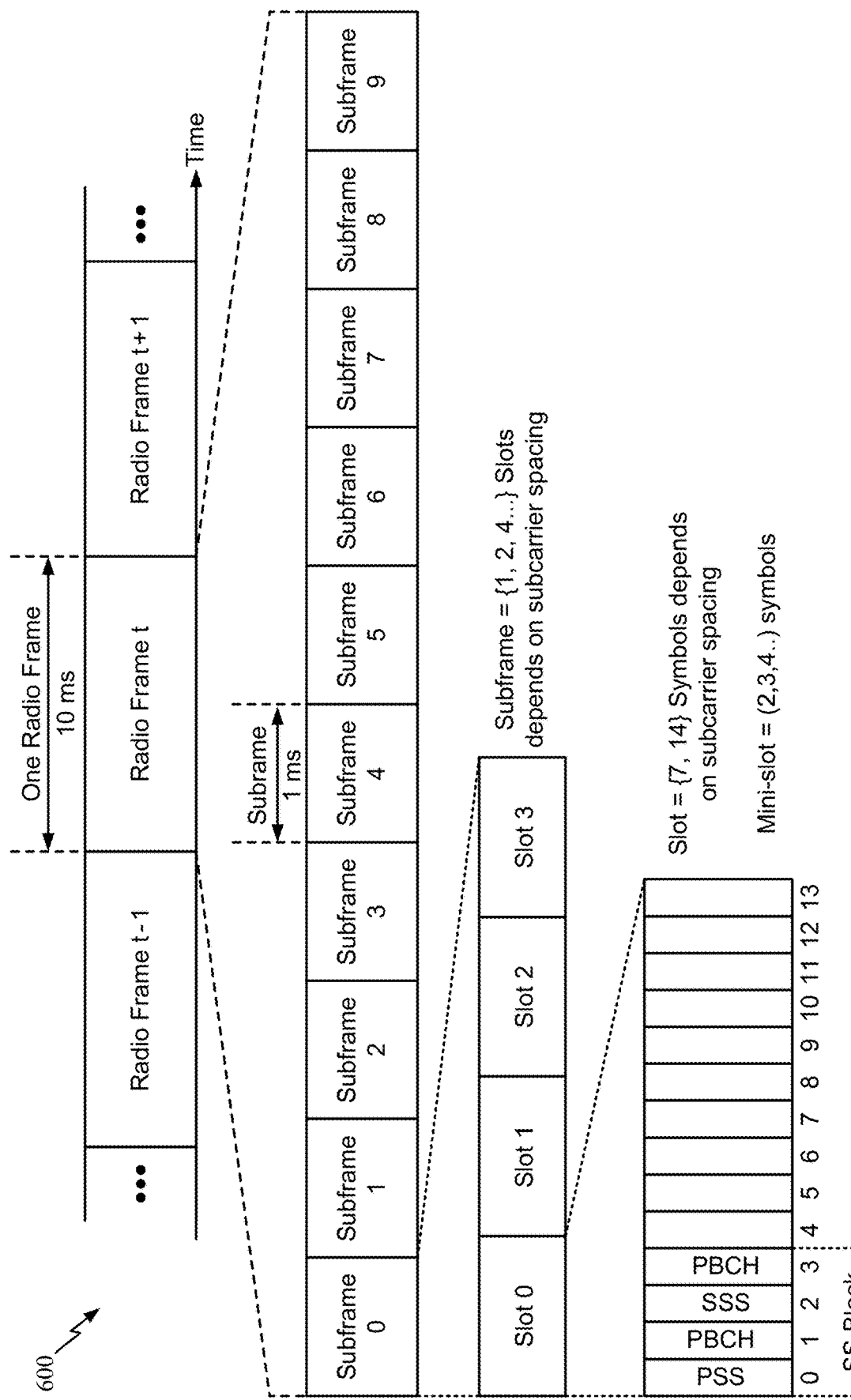
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices.

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Aspects of the present disclosure provide apparatus, methods, processing systems, and computer readable mediums for processing downlink transmissions scheduled with non-numeric acknowledgment feedback timing indicators. Certain techniques presented herein may be used to determine if and when to send acknowledgment feedback for such transmissions. Certain other techniques presented herein may be used to determine when a UE is able to receive a downlink control information (DCI) scheduling a downlink transmission for a certain hybrid automatic repeat request (HARQ) ID process before sending acknowledgment feedback for a downlink transmission for the same HARQ ID process.

Figure 7:
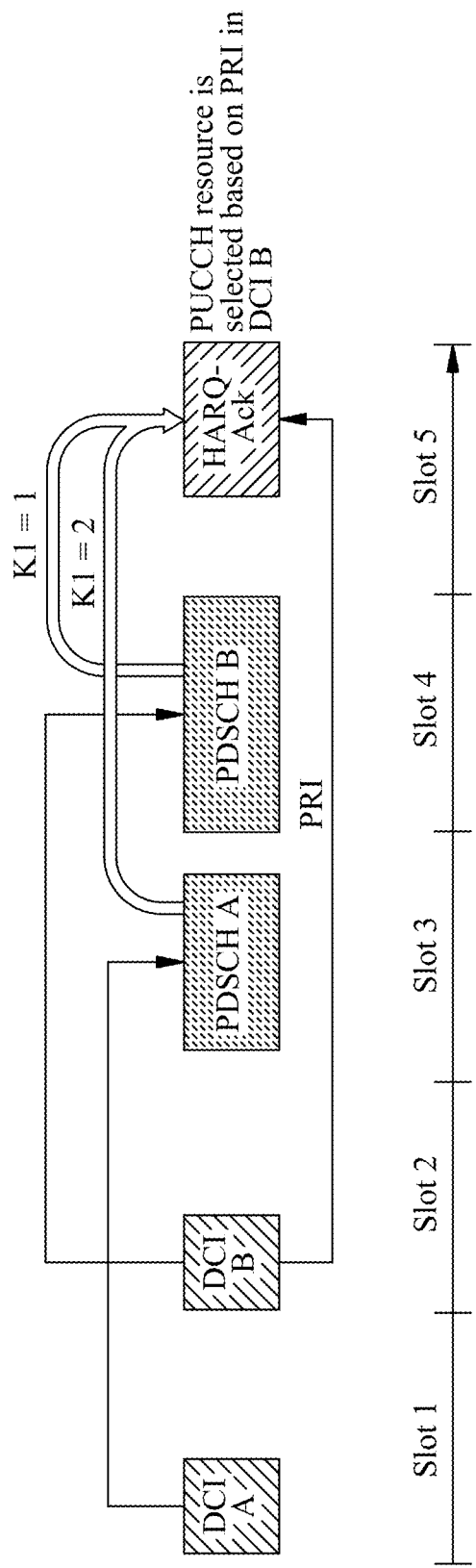
FIG. 7 illustrates multiple DCI transmission, PDSCH transmissions, and the corresponding HARQ-ACK transmission for the DCI and PDSCH transmissions, in accordance with certain aspects of the present disclosure.

As illustrated in FIG. 7, physical downlink shared channel (PDSCH) transmissions are typically scheduled with an indication of when to provide acknowledgment (e.g., HARQ ACK/NACK) feedback for the scheduled PDSCH. The indication is shown in the figure as a parameter K1, which is often referred to as a "PDSCH-to-HARQ" feedback timing indicator and is provided as a field in the downlink DCI.

FIG. 7 illustrates multiple DCI transmissions, each scheduling a corresponding PDSCH transmission. In certain wireless communication systems, a base station (BS) may schedule transmissions to a user equipment (UE) by sending the UE a downlink grant. In some examples, a next generation Node (gNB) may send a downlink grant (in a DCI) scheduling the UE for a PDSCH transmission. In some examples, the DCI may be a fallback DCI (e.g., DCI format 1_0) or a regular DCI (e.g., DCI format 1_1). The K1 field for the fallback DCI may have 3 bits and indicate values of {1,2, 3 . . . 8}. In some examples, the K1 field for the non-fallback DCI may have up to 3 bits, and may indicate one of the entries of the higher layer parameter "dl-DataToUL-ACK" (e.g., the value indicates an index to select a value from a set configured by radio resource control (RRC)). The maximum size of the set may be 8, while the maximum value of the set may be 15. The DCI may include other information, as well, such as a HARQ process ID for the scheduled PDSCH transmission.

As illustrated in FIG. 7, the K1 value may indicate a slot for the UE to provide HARQ acknowledge (ACK) or negative ACK (NACK) information for the PDSCH transmission. In the illustrated example, the first PDSCH transmission (PDSCH A scheduled by DCI A) has a K1 value of 2, while the second PDSCH transmission (PDSCH B scheduled by DCI B) has a K1 value of 1. As PDSCH A is sent in slot 3, the K1 value of 2 indicates HARQ-ACK for PDSCH A is sent in slot 5 (e.g., via a physical uplink control channel (PUCCH) transmission). Even though PDSCH B is sent in slot 4, the K1 value of 1 indicates HARQ-ACK for PDSCH B is also sent in slot 5.

In this manner, the K1 may define the processing time for the UE to decode the PDSCH transmission and prepare the ACK/NACK transmission. As in the examples illustrated in FIG. 7, the K1 value may indicate a number of slots from the end of the PDSCH transmission to the time at which the UE sends the ACK/NACK to the BS.

Furthermore, downlink (DL) DCI (DCI scheduling PDSCH) may indicate the PUCCH resource for sending the HARQ-ACK feedback via a PUCCH resource indicator (PRI). The PRI may have three bits that may signal up to 8 possibilities within PUCCH resources within a PUCCH resource set in a given slot. The PRI corresponding to the last DCI may be considered among all the DCIs that have a value of K1 indicating a same slot for HARQ-ACK transmission for indicating the PUCCH resource.

In some cases, a non-numerical value of K1 may be signaled for a scheduled PDSCH transmission. For example, a reserved value of K1 may be used to indicate a non-numerical value added to the possible range of PDSCH-to-HARQ-timing-indicator values defined in Rel-15. This non-numeric K1 value may be used to indicate to the UE that the HARQ-ACK feedback for the corresponding PDSCH is postponed until the timing and resource for the HARQ-ACK feedback is provided by the BS.

Determining exactly if and when a UE is to provide the HARQ-ACK feedback for a PDSCH schedule with a non-numeric K1 value presents a challenge. For example, a UE and base station may need to both be aware of how this determination is made, or HARQ-ACK feedback may be missed or misinterpreted by the base station, which may lead to either unnecessary re-transmissions or a failure to retransmit data not successfully received.

Figure 8:
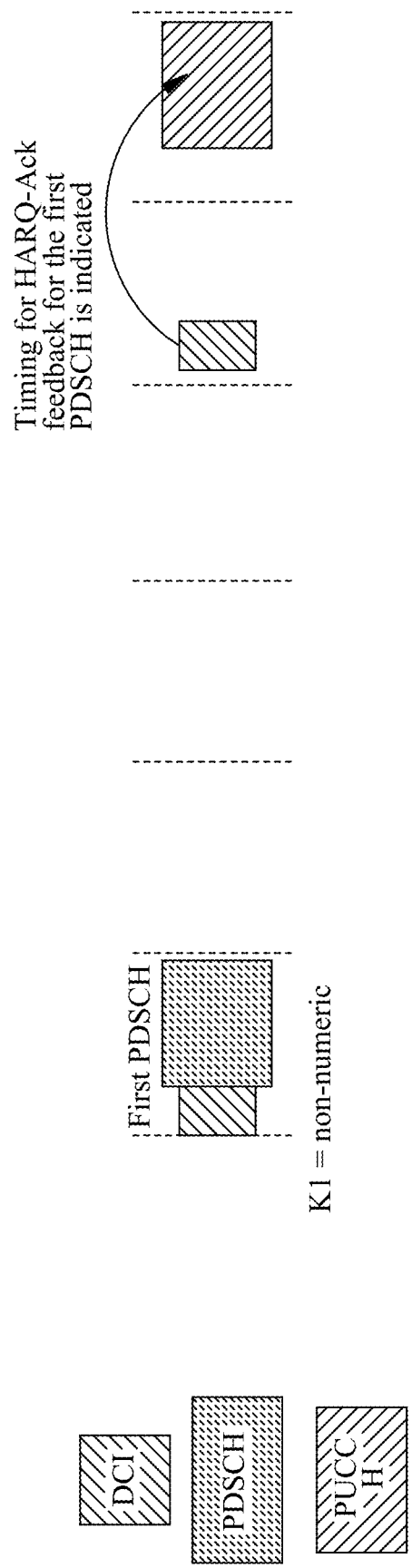
FIG. 8 illustrates multiple DCI transmission, PDSCH transmissions, and the corresponding HARQ-ACK transmission for the DCI and PDSCH, in accordance with certain aspects of the present disclosure.

Aspects of the present disclosure, however, provide various techniques for determining if and when to send acknowledgment feedback for PDSCH transmissions scheduled with non-numeric K1 values, which may allow a UE and BS to be able to properly send and interpret corresponding HARQ-ACK transmissions. As illustrated in FIG. 8, in some cases, timing of HARQ-ACK for a PDSCH transmission scheduled with a non-numeric K1 value may be indicated (or determined by) a subsequent DCI transmission.

Figure 9:
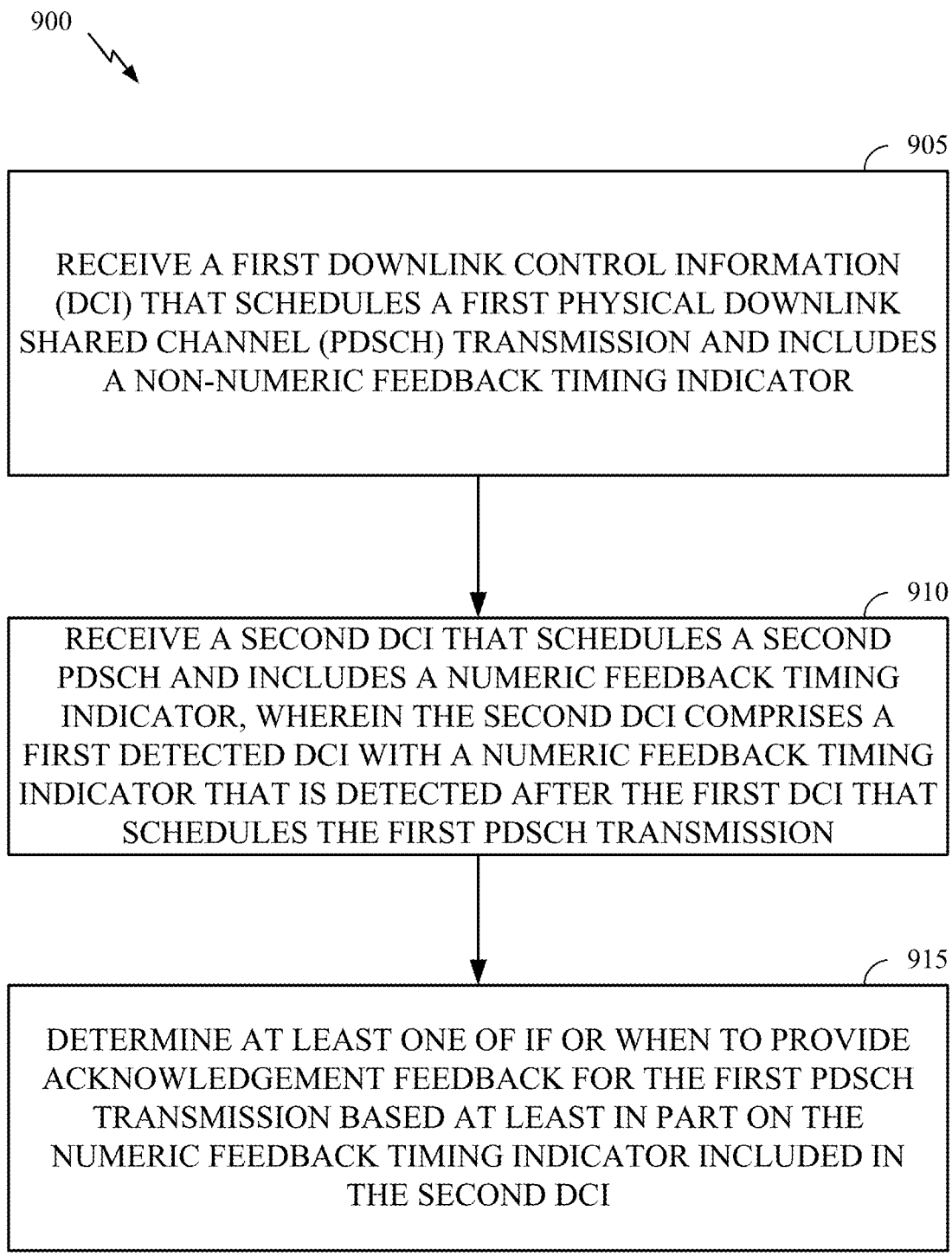
FIG. 9 is a flow diagram illustrating example operations for wireless communication by a UE, in accordance with certain aspects of the present disclosure.

FIG. 9 is a flow diagram illustrating example operations 900 for wireless communication, in accordance with certain aspects of the present disclosure. The operations 900 may be performed, for example, by UE (e.g., such as a UE 120 in the wireless communication network 100).

The operations 900 begin, at 905, by receiving a first downlink control information (DCI) that schedules a first physical downlink shared channel (PDSCH) transmission and includes a non-numeric feedback timing indicator. At 910, the UE receives a second DCI. At 915, the UE determines at least one of if or when to provide acknowledgement feedback for the first PDSCH transmission based at least in part on the second DCI.

Figure 10:
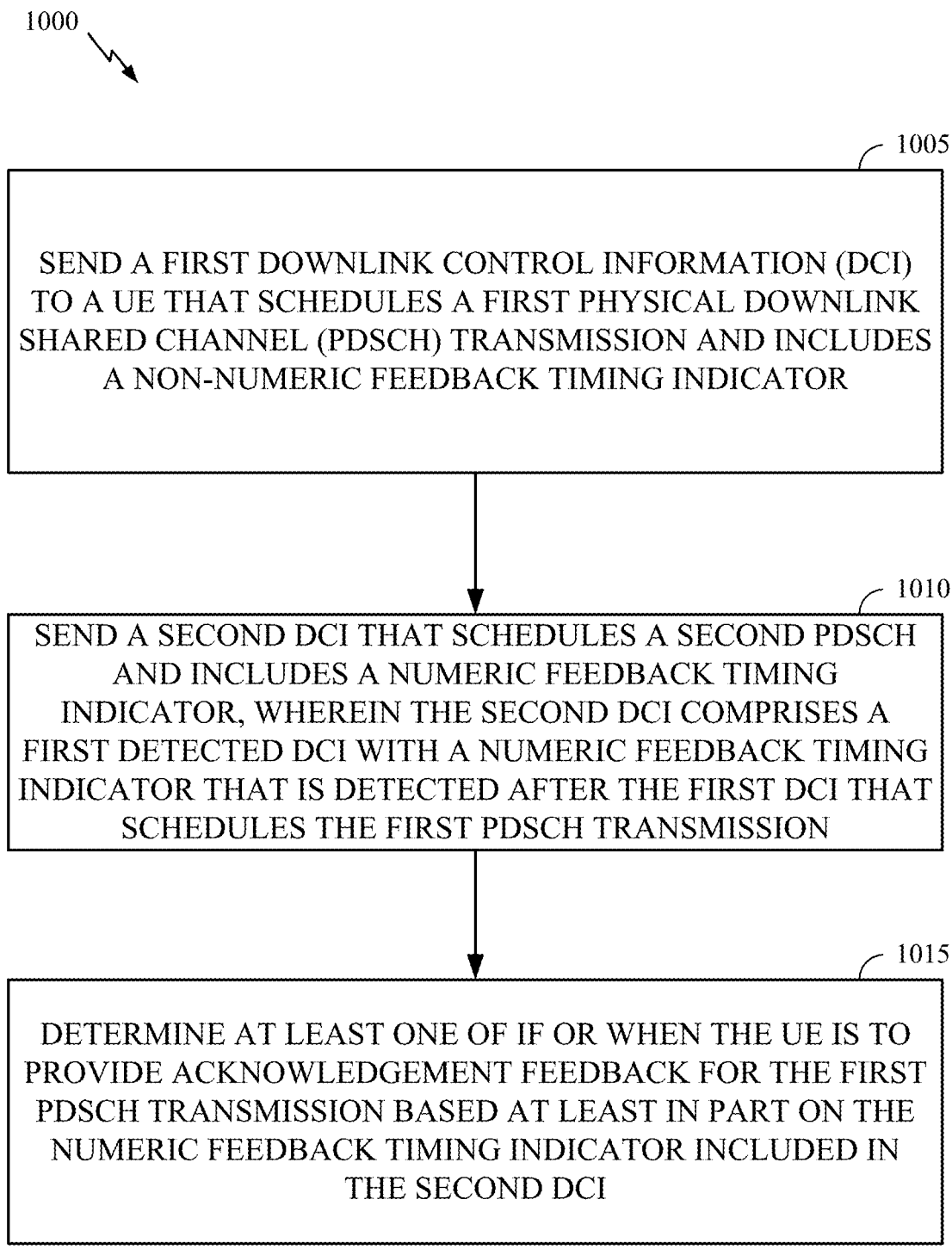
FIG. 10 is a flow diagram illustrating example operations for wireless communication by a network entity, in accordance with certain aspects of the present disclosure.

FIG. 10 is a flow diagram illustrating example operations 1000 for wireless communication, in accordance with certain aspects of the present disclosure. The operations 1000 may be performed, for example, by base station (e.g., such as BS 110/gNB in the wireless communication network 100) to process ACK feedback from a UE sent in accordance with operations 900 of FIG. 9.

The operations 1000 begin, at 1005, by sending a first downlink control information (DCI) to a UE that schedules a first physical downlink shared channel (PDSCH) transmission and includes a non-numeric feedback timing indicator. At 1010, the network entity sends a second DCI. At 1015, the UE determines at least one of if or when the UE to provide acknowledgement feedback for the first PDSCH transmission based at least in part on the second DCI.

Operations 900 and 1000 may allow a UE and BS (e.g., gNB) to determine when PDSCH transmissions for a HARQ processing having not-yet acknowledged previous PDSCH transmissions. A gNB may use the rules described herein to determine when it may send (re-transmit) a UE a PDSCH transmission (for a HARQ processing having not-yet acknowledged previous PDSCH transmissions). On the other hand, if a UE detects a PDSCH transmission for a HARQ process in violation of the rules, the UE may discard the PDSCH transmission (e.g., treat the PDSCH transmission as an error condition).

In certain aspects, the second DCI may schedule a second PDSCH and may include a numeric K1 value. In such cases, the determination of if or when to provide HARQ-ACK feedback for the first PDSCH transmission may be based at least in part on the numeric feedback timing indicator included in the second DCI. In certain aspects, acknowledgment feedback may be transmitted for both the first PDSCH transmission and the second PDSCH transmission in a same slot and physical uplink control channel (PUCCH) resource.

Figure 11A:
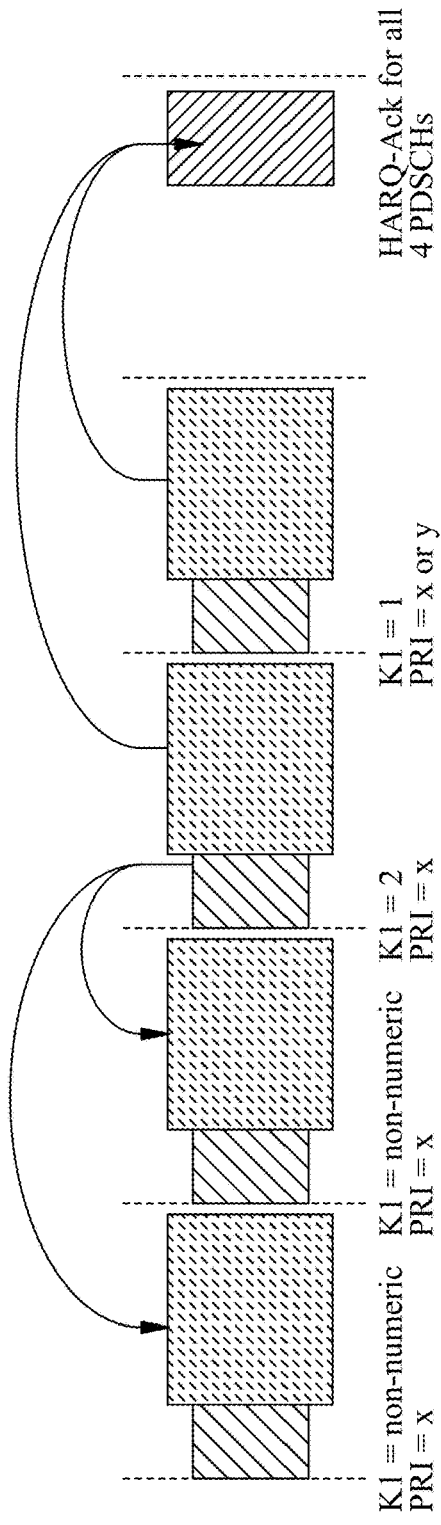
FIGS. 11A and 11B illustrates the HARQ-ACK transmissions for DCI and PDSCH transmissions having non-numeric feedback timing indicator, in accordance with certain aspects of the present disclosure.

In some cases, as illustrated in FIG. 11A, HARQ-ACK for one or more PDSCH transmissions scheduled with non-numerical feedback timing indicators may be based on a first detected DCI with a numeric feedback timing indicator (e.g., detected after the first DCI that schedules the first PDSCH transmission). In the example illustrated in FIG. 11A, the first detected DCI with a numeric K1 value is the DCI with K1=2 and PRI=X. In this case, HARQ-ACK for multiple PDSCH transmissions scheduled with non-numeric K1 values may be transmitted with the HARQ-ACK for a PDSCH scheduled by that DCI (2 slots later, based on the K1=2 value). In the illustrated example, HARQ-ACK for a fourth PDSCH (scheduled with a DCI having K1=1 and PRI=X or Y) may also be sent in the same slot.

Figure 11B:
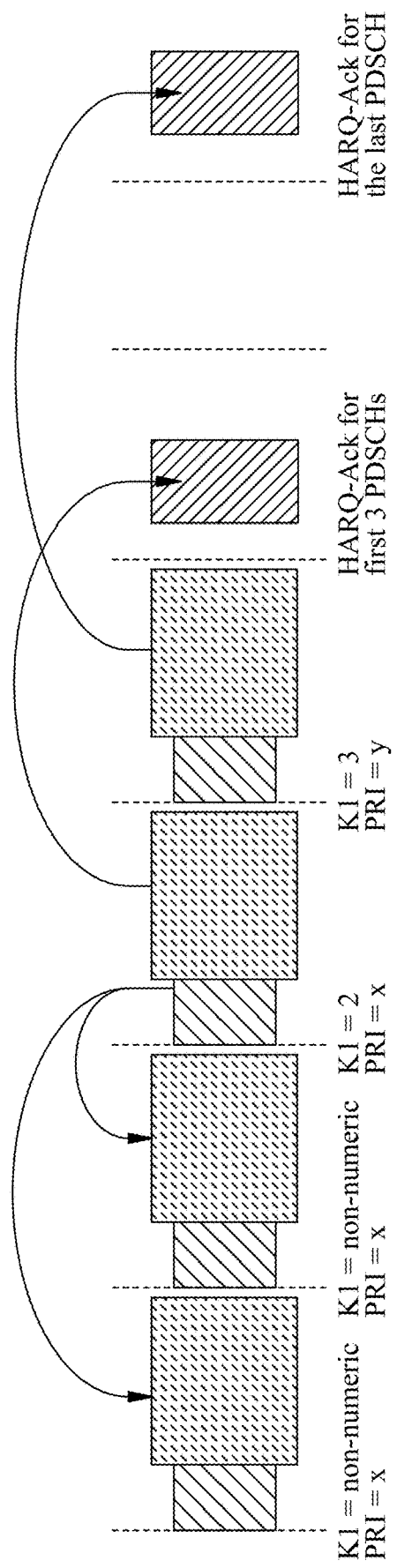

In some cases, as illustrated in FIG. 11B, HARQ-ACK may be sent for the first PDSCH transmission only if a physical uplink control channel (PUCCH) resource indicator (PRI) in the first detected DCI with a numeric K1 value matches a PRI in the first DCI that schedules the first PDSCH transmission. In the example illustrated in FIG. 11B, the first detected DCI with a numeric K1 value (K1=2) has a PRI=X, which matches the PRI for the PDSCH transmissions scheduled with non-numeric K1 values. Thus, HARQ-ACK for these PDSCH transmissions may be transmitted with the HARQ-ACK for a PDSCH scheduled by that DCI (2 slots later, based on the K1=2 value). However, if the subsequent DCI (with K1=3 and PRI=Y) had been the first DCI detected with a numeric K1 value, the HARQ-ACK for the PDSCH transmissions scheduled with non-numeric K1 values would not have been transmitted (e.g., the HARQ ACK in this case may be dropped).

One potential benefit of examining the PRI values of the DCI transmission is that doing so may help avoid a mismatch/misinterpretation of ACK/NACKs by the BS. On the other hand, requiring a PRI match may reduce flexibility in PUCCH resource selection for the first HAR-ACK because the PRI is used for the purpose of matching with the PRI of the first two DCI transmission, which is not the original purpose of the PRI. In some cases where PRIs are not matched, PUCCH resources may be selected based on the PRI of a last DCI transmission (e.g., PRI=Y in the example of FIG. 11B).

In some cases, the second DCI may not schedule a PDSCH transmission at all. For example, such DCI may be used primarily for indicating the timing of HARQ-ACK for PDSCH transmission scheduled with non-numeric K1 values. In some cases, this type of DCI may be addressed to one or more UEs. Further, this type of DCI may be used to indicate the timing and PUCCH resources for one or a subset of the addressed UEs to use for transmitting acknowledgment feedback for one or more PDSCH transmissions scheduled with non-numeric feedback timing indicators. In some cases, such DCI may identify the one or more PDSCH transmissions by indicating their corresponding HARQ process IDs.

Another challenge presented by non-numeric K1 values is when to apply actions conveyed in media access control (MAC) control elements (CE) commands carried by a corresponding PDSCH transmission. Conventionally, the timing of applying such actions is based on the HARQ-ACK timing. Thus, the same challenges for determining if and when to send HARQ-ACK for PDSCH transmission scheduled with non-numeric K1 values may apply to if and when to apply actions specified by a MAC-CE carried in these PDSCH transmissions.

In some aspects, the determination of at least one of if or when to apply the action may be to apply the action at a fixed time after transmitting acknowledgment feedback for the first PDSCH transmission. In some aspects, the determination of at least one of if or when to apply the action may be to apply the action only if acknowledgment feedback is transmitted for the first PDSCH transmission. In some aspects, the determination of at least one of if or when to apply the action may be to apply the action a fixed time after a next expected transmission of acknowledgment feedback regardless of whether the acknowledgment feedback is for the first PDSCH transmission that carries the MAC-CE.

Non-numeric K1 values also present a challenge when determining when to include HARQ-ACK feedback, due to the uncertain timing of such. Conventionally, if a PDSCH falls inside of a window defined by a set of (numeric) K1 values, then a rule for determining a semi-static codebook is followed.

In certain systems, the type-1 (semi-static) codebook has a size that is determined only via semi-static information based on PDSCH transmission occasions. In some cases, the UE does not take into account PDCCH monitoring occasion for Type 1 HARQ_ACK codebook. The set of PDSCH transmission occasions may be determined on a per DL serving cell basis. In some aspects, the set of K1 values may include {1,2,3,4,5,6,7,8} if only DCI 1_0 is configured and DCI 1_1 is not configured in the serving cell, and the set of PDSCH time domain resource allocation (TDRA) candidates (within a slot) may be denoted by R (from TDRA table configured or the default TDRA table). In some cases the set of PDSCH occasions may be determined on a per DL serving cell basis by TDD uplink (UL) and/or DL configuration. In certain systems, the HARQ-ACK codebook may be arranged in time-first (for PDSCH transmission occasions), cell second arrangements: ACK/NACK bits for cell 0, ACK/NACK bits for cell 1, and so on. The number of ACK/NACK transmission per PDSCH transmission occasion per serving cell may depend on other configurations such as the number of transport blocks (TBs) per PDSCH transmission (e.g., 1 or 2), code block group (CBG) configurations (e.g., up to 8), and other factors. In the codebook, the UE may insert the actual ACK/NACK for a PDSCH transmission occasion if the UE receives a DCI transmission that indicates for the UE to feedback an ACK/NACK for the PDSCH transmission the PUCCH slot. Otherwise, the UE may generate a NACK. In some aspects, if the DCI transmission is missed, the UE may report a NACK. The size of the codebook may become large for multiple reasons. For example, reasons for the size of the codebook may include mini-slots (where more than 1 PDSCH transmission occasion is in a slot), a large K1 set size, a large number of serving cells (CCs), and CBG configurations.

Figure 12:
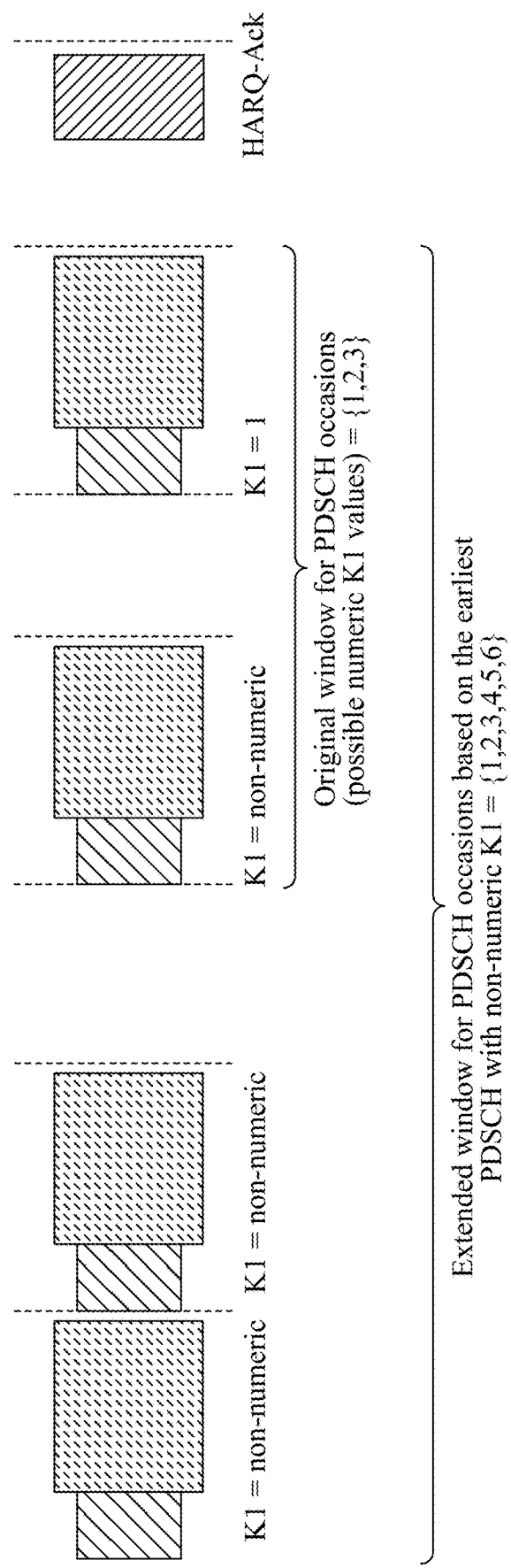
FIG. 12 illustrates transmission windows for PDSCH transmission occasions for numeric and non-numeric feedback timing indicators, in accordance with certain aspects of the present disclosure.

As illustrated in FIG. 12, however, a PDSCH scheduled by a non-numeric K1 value, however, may or may not fall within such a window. For example, of the 3 PDSCH transmissions shown in FIG. 12 that are scheduled with non-numeric K1 values, only the last one may fall within an original window defined by a set of (numeric) K1 values. There may be various options for providing HARQ-ACK feedback for the PDSCH transmissions that fall outside of the window. For example, one option may be that ACK/NACK for such PDSCH transmissions may be not reported in the codebook (e.g., simply dropped). A second option, shown in FIG. 12, is that the window for determining PDSCH occasions may be effectively extended (up to the slot with the earliest PDSCH with non-numeric K1 with pending A/N). One challenge with this latter option is that it may result in a codebook size mismatch issue, for example, in the case that a DCI (e.g., a DCI scheduling the earliest PDSCH) is missed.

Another challenge presented by non-numeric K1 values is when a UE is allowed to receive scheduling for a given HARQ ID process, before sending HARQ-ACK feedback for a previous PDSCH for the same HARQ-ID. In certain systems, a UE may not be allowed to receive a DCI scheduling PDSCH for the same HARQ ID before sending an ACK/NACK transmission. In such circumstances, the UE may not be expected to receive another PDSCH transmission for a given HARQ process until after the end of the expected transmission of HARQ-ACK for that HARQ process. This may be the case for both retransmission with the same HARQ process ID and a new data indicator (NDI) set to indicate no new data, as well as an original transmission of a new TB having the same HARQ process ID and NDI toggled to indicate new data.

Aspects of the present disclosure, however, provide an approach where a UE and base station may resolve this issue.

Figure 13:
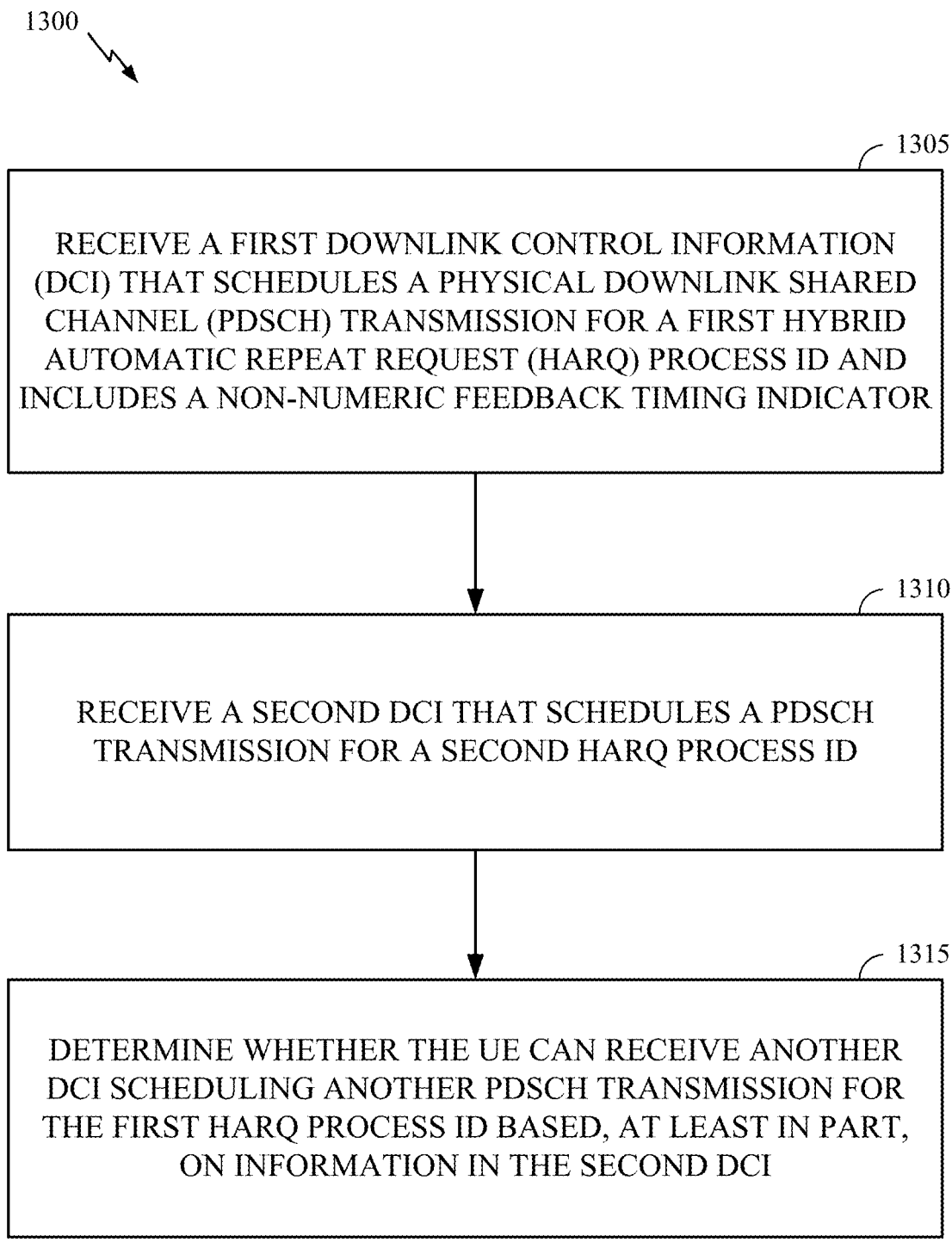
FIG. 13 is a flow diagram illustrating example operations for wireless communication by a UE, in accordance with certain aspects of the present disclosure.

FIG. 13 is a flow diagram illustrating example operations 1300 for wireless communication, in accordance with certain aspects of the present disclosure. The operations 1300 may be performed, for example, by a UE (e.g., such as a UE 120 in the wireless communication network 100).

The operations 1300 begin, at 1305, by receiving a first downlink control information (DCI) that schedules a physical downlink shared channel (PDSCH) transmission for a first hybrid automatic repeat request (HARQ) process ID and includes a non-numeric feedback timing indicator. At 1310, the UE receives a second DCI that schedules a PDSCH transmission for a second HARQ process ID. At 1315, the UE determines when the UE may receive another DCI scheduling another PDSCH transmission for the first HARQ process ID based, at least in part, on information in the second DCI.

Figure 14:
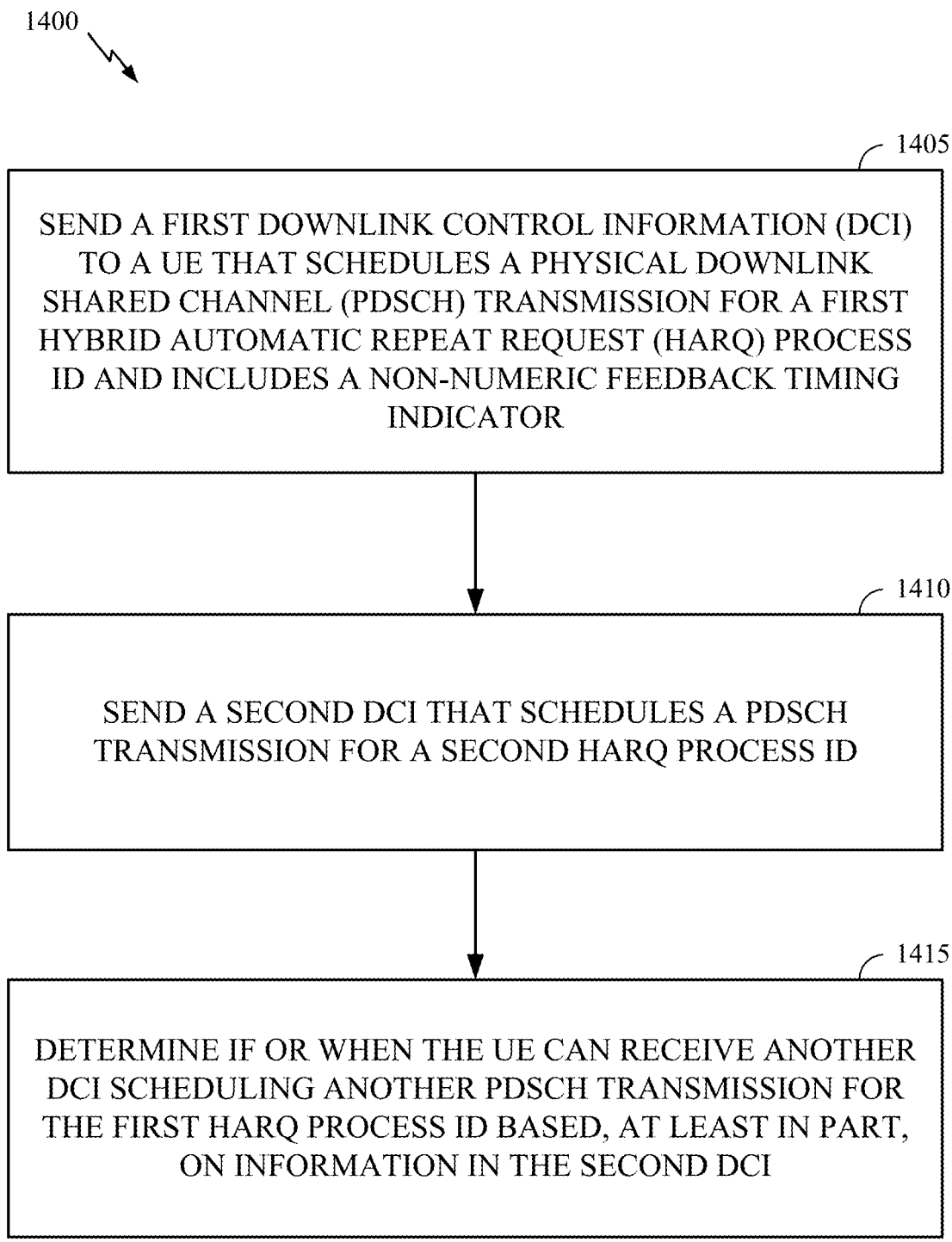
FIG. 14 is a flow diagram illustrating example operations for wireless communication by a network entity, in accordance with certain aspects of the present disclosure.

FIG. 14 is a flow diagram illustrating example operations 1400 for wireless communication, in accordance with certain aspects of the present disclosure. The operations 1400 may be performed, for example, by a BS (e.g., such a BS 110/gNB in the wireless communication network 100), to schedule PDSCH transmissions to a UE performing operations 1300 of FIG. 13.

The operations 1400 begin, at 1405, by sending a first downlink control information (DCI) that schedules a physical downlink shared channel (PDSCH) transmission for a first hybrid automatic repeat request (HARQ) process ID and includes a non-numeric feedback timing indicator. At 1410, the network entity sends a second DCI that schedules a PDSCH transmission for a second HARQ process ID. At 1415, the network entity determines when the UE can receive another DCI scheduling another PDSCH transmission for the first HARQ process ID based, at least in part, on information in the second DCI.

According to a first option, when a first PDSCH transmission is scheduled with a non-numeric K1 value for a given HARQ process ID, a second PDSCH transmission with the same HARQ process ID may be received after the end of next expected transmission of HARQ-ACK, regardless of whether the HARQ-ACK includes the ACK/NACK for the first PDSCH transmission or not. According to a second, when a first PDSCH transmission is scheduled with a non-numeric K1 value for a given HARQ process ID, a second PDSCH transmission with the same HARQ process ID may be received after the end of the expected transmission of the HARQ-ACK for that HARQ process, if the next detected DCI with a numerical K1 has a matching PRI. Examples of these first two options are illustrated in FIG. 15A, where a first PDSCH with a HARQ ID=3 is scheduled with a non-numeric K1 value via a first DCI. Subsequently, a second DCI may schedules second PDSCH transmission for a second PDSCH with a HARQ ID=2, with a numeric value of K1=2. As illustrated, a DCI scheduling a subsequent PDSCH for HARQ ID=3 may be received after the HARQ ACK is sent 2 slots after the second DCI (regardless of whether HARQ ACK is sent for the first PDSCH transmission per the first option or whether only the HARQ ACK is sent for the first PDSCH transmission per the second option).

In some cases, when a first PDSCH transmission is scheduled with a non-numeric K1 value for a given HARQ process ID, a second PDSCH transmission with the same HARQ process ID may be received after the end of that DCI or after the end of the PDSCH transmission that is scheduled with that DCI, if the next detected DCI with a numerical K1 does not have a matching PRI. Examples of these options are illustrated in FIG. 15B, where a first PDSCH with a HARQ ID=3 is scheduled with a non-numeric K1 value via a first DCI. Subsequently, a second DCI may schedule a second PDSCH transmission for a second PDSCH with a HARQ ID=2, with a numeric value of K1=2. In this example, however, the PRI of the second DCI may not match the PRI of the first DCI. Therefore, the ACK/NACK for the first PDSCH may be dropped. As a result, a second PDSCH for HARQ ID=3 may be received either after the end of the second DCI or after the end of the second PDSCH.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. For example, operations shown in FIGS. 9 and/or 13 may be performed by one or more processors of the UE 120 shown in FIG. 4, while operations shown in FIGS. 10 and/or 14 may be performed by one or more processors of the BS 110 shown in FIG. 4.

A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-10 and 13-14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a user equipment (UE), comprising:
at least one processor configured to:
receive a first downlink control information (DCI) that schedules a first physical downlink shared channel (PDSCH) transmission and includes a non-numeric feedback timing indicator;
receive a second DCI that schedules a second PDSCH transmission and includes a numeric feedback timing indicator, wherein the second DCI comprises a first detected DCI with a numeric feedback timing indicator that is detected after the first DCI that schedules the first PDSCH transmission; and
determine at least one of whether to or when to transmit acknowledgment feedback for the first PDSCH transmission based at least in part on the numeric feedback timing indicator included in the second DCI, wherein:
when the determination is to transmit acknowledgment feedback for the first PDSCH transmission, the processor is further configured to transmit acknowledgment feedback for both the first PDSCH transmission and the second PDSCH transmission in a same slot and physical uplink control channel (PUCCH) resource; and
a memory coupled with the at least one processor.

2. The apparatus of claim 1, wherein:
the second DCI does not schedule a PDSCH transmission.

3. The apparatus of claim 2, wherein the DCI is addressed to one or more UEs.

4. The apparatus of claim 3, wherein the second DCI is used to indicate the timing and PUCCH resources for one or a subset of the UEs to use for transmitting acknowledgment feedback for one or more PDSCH transmissions scheduled with non-numeric feedback timing indicators.

5. The apparatus of claim 4, wherein the second DCI further identifies the one or more PDSCH transmissions by indicating a corresponding one or more hybrid automatic repeat request (HARM) process IDs.

6. The apparatus of claim 1, wherein the at least one processor is further configured to:
determine at least one of whether to or when to apply an action indicated by a media access control (MAC-CE) command carried by the first PDSCH transmission.

7. The apparatus of claim 6, wherein the determination of at least one of whether to or when to apply the action is based at least in part on the second DCI.

8. The apparatus of claim 6, wherein the determination of at least one of whether to or when to apply the action is to apply the action at a fixed time after transmitting acknowledgment feedback for the first PDSCH transmission.

9. The apparatus of claim 6, wherein the determination of at least one of whether to or when to apply the action is to apply the action only when acknowledgment feedback is transmitted for the first PDSCH transmission.

10. The apparatus of claim 6, wherein the determination of at least one of whether to or when to apply the action is to apply the action a fixed time after a next expected transmission of acknowledgment feedback regardless of whether the acknowledgment feedback is for the first PDSCH transmission that carries the MAC-CE.

11. The apparatus of claim 6, wherein the determination of at least one of whether to or when to apply the action is to apply the action a fixed time after an end of the first PDSCH transmission that carries the MAC-CE.

12. An apparatus for wireless communications by a user equipment (UE), comprising:
at least one processor configured to:
receive a first downlink control information (DCI) that schedules a physical downlink shared channel (PDSCH) transmission for a first hybrid automatic repeat request (HARQ) process ID and includes a non-numeric feedback timing indicator;
receive a second DCI that schedules a PDSCH transmission for a second HARQ process ID; and
determine when the UE can receive another DCI scheduling another PDSCH transmission for the first HARQ process ID based, at least in part, on information in the second DCI; and
a memory coupled with the at least one processor.

13. The apparatus of claim 12, wherein:
the second DCI includes a numeric feedback timing indicator for providing acknowledgment feedback for the PDSCH transmission for a second HARQ process ID; and
the determination is that the UE can receive another DCI scheduling another PDSCH transmission for the first HARQ process ID after transmitting acknowledgment feedback for the PDSCH transmission for the second HARQ process ID.

14. The apparatus of claim 12, wherein the UE transmits acknowledgment feedback for both the PDSCH transmission for the first HARQ process ID and the PDSCH transmission for the second HARQ process ID in a same slot same resources.

15. An apparatus for wireless communications by a network entity, comprising:
at least one processor configured to:
send a first downlink control information (DCI) that schedules a first physical downlink shared channel (PDSCH) transmission to a user equipment (UE) and includes a non-numeric feedback timing indicator;
send a second DCI that schedules a second PDSCH transmission and includes a numeric feedback timing indicator, wherein the second DCI comprises a first detected DCI with a numeric feedback timing indicator that is detected after the first DCI that schedules the first PDSCH transmission; and
determine at least one of whether or when the UE is to transmit acknowledgment feedback for the first PDSCH transmission based at least in part on the numeric feedback timing indicator included in the second DCI, wherein:
when the determination is the UE is to transmit acknowledgment feedback for the first PDSCH transmission, the at least one processor is configured to receive acknowledgement feedback for both the first PDSCH transmission and the second PDSCH transmission in a same slot and physical uplink control channel (PUCCH) resource, and
a memory coupled with the at least one processor.

16. The apparatus of claim 15, wherein:
the second DCI does not schedule a PDSCH transmission.

17. The apparatus of claim 16, wherein the DCI is addressed to one or more UEs.

18. The apparatus of claim 17, wherein the second DCI is used to indicate the timing and PUCCH resources for one or a subset of the UEs to use for transmitting acknowledgment feedback for one or more PDSCH transmissions scheduled with non-numeric feedback timing indicators.

19. The apparatus of claim 18, wherein the second DCI further identifies the one or more PDSCH transmissions by indicating a corresponding one or more hybrid automatic repeat request (HARQ) process IDs.

20. The apparatus of claim 15, wherein the at least one processor is further configured to:
determine at least one of whether or when the UE is to apply an action indicated by a media access control (MAC-CE) command carried by the first PDSCH transmission.

21. The apparatus of claim 20, wherein the determination of at least one of whether or when the UE is to apply the action is based at least in part on the second DCI.

22. The apparatus of claim 20, wherein the determination of at least one of whether or when the UE is to apply the action is to apply the action a fixed time after transmitting acknowledgment feedback for the first PDSCH transmission.

23. The apparatus of claim 20, wherein the determination of at least one of whether or when the UE is to apply the action is to apply the action only when acknowledgment feedback is transmitted for the first PDSCH transmission.

24. The apparatus of claim 20, wherein the determination of at least one of whether or when the UE is to apply the action is to apply the action a fixed time after a next expected transmission of acknowledgment feedback regardless of whether the acknowledgment feedback is for the first PDSCH transmission that carries the MAC-CE.

25. The apparatus of claim 20, wherein the determination of at least one of whether or when the UE is to apply the action is to apply the action a fixed time after an end of the first PDSCH transmission that carries the MAC-CE.

26. An apparatus for wireless communications by a network entity, comprising:
at least one processor configured to:
send a first downlink control information (DCI) to a user equipment (UE) that schedules a physical downlink shared channel (PDSCH) transmission for a first hybrid automatic repeat request (HARQ) process ID and includes a non-numeric feedback timing indicator;
send a second DCI that schedules a PDSCH transmission for a second HARQ process ID; and
determine when the UE can receive another DCI scheduling another PDSCH transmission for the first HARQ process ID based, at least in part, on information in the second DCI; and
a memory coupled with the at least one processor.

27. The apparatus of claim 26, wherein:
the second DCI includes a numeric feedback timing indicator for providing acknowledgment feedback for the PDSCH transmission for a second HARQ process ID; and
the determination is that the UE can receive another DCI scheduling another PDSCH transmission for the first HARQ process ID after transmitting acknowledgment feedback for the PDSCH transmission for the second HARQ process ID.

28. The apparatus of claim 27, wherein the UE transmits acknowledgment feedback for both the PDSCH transmission for the first HARQ process ID and the PDSCH transmission for the second HARQ process ID in a same slot same resources.

* * * * *